Oct. 26, 1965   W. R. PETERSON   3,213,588
AUTOMATIC VALVE BAG APPLICATOR
Filed March 2, 1961   10 Sheets-Sheet 4
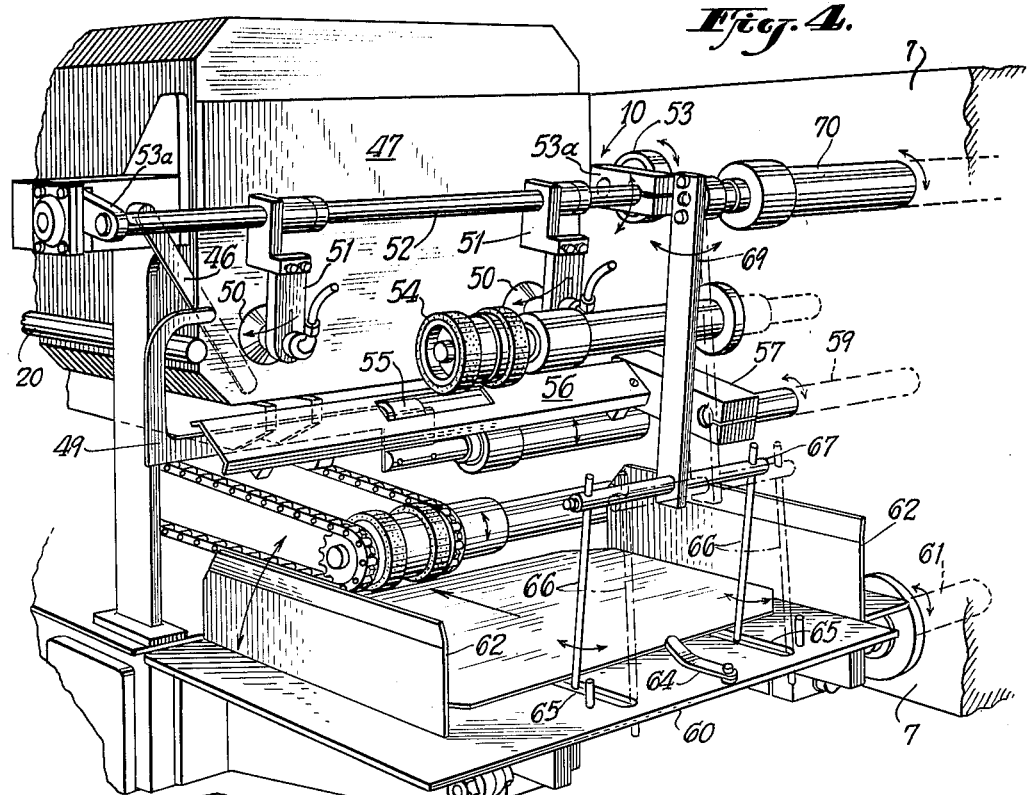
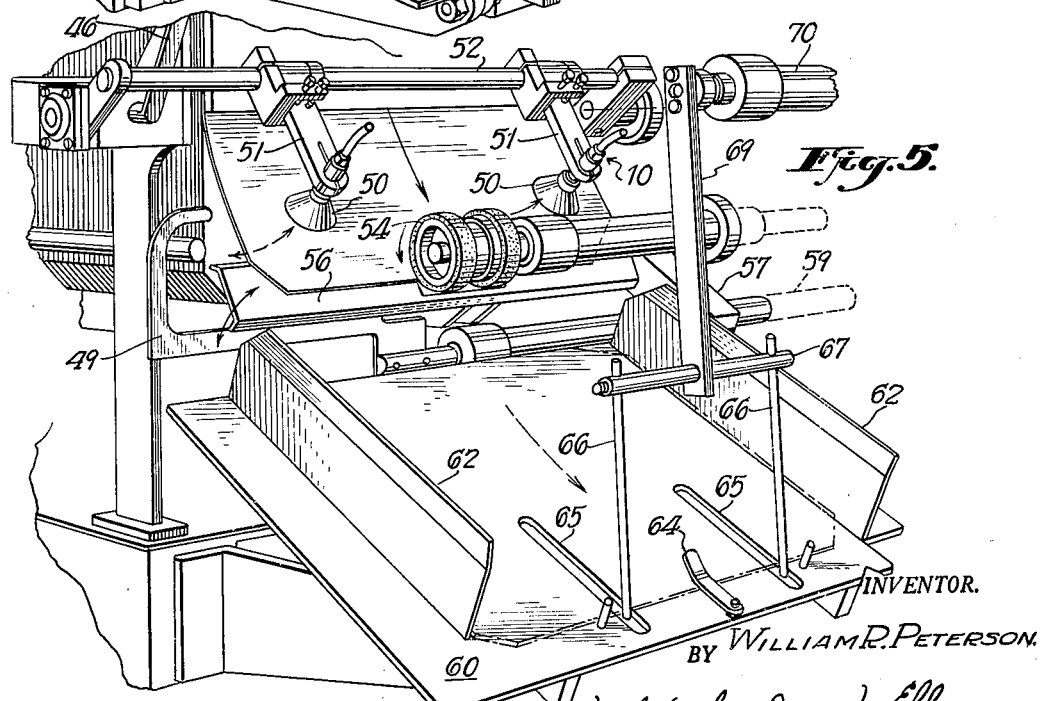
INVENTOR.
BY WILLIAM R. PETERSON
ATTORNEYS.

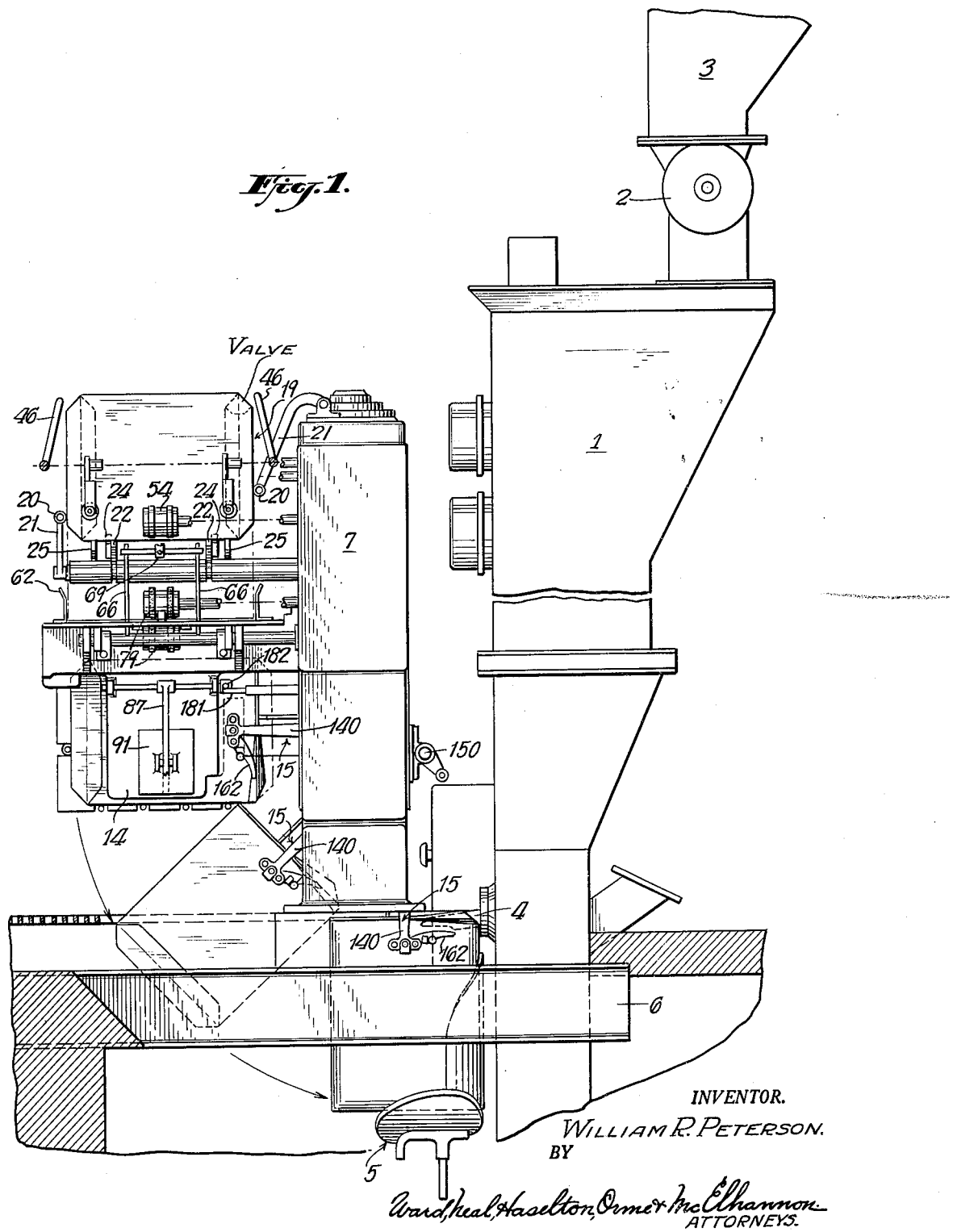

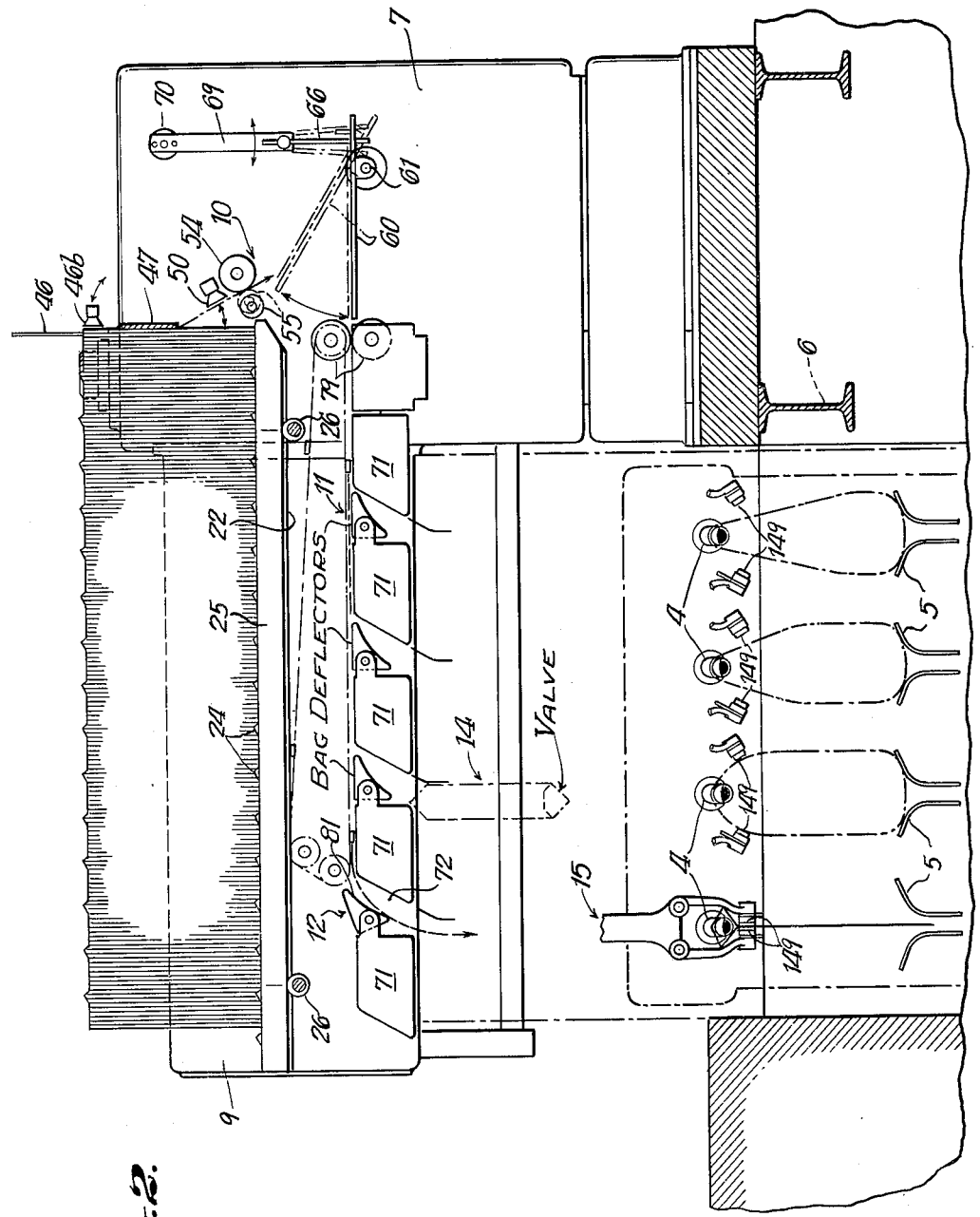

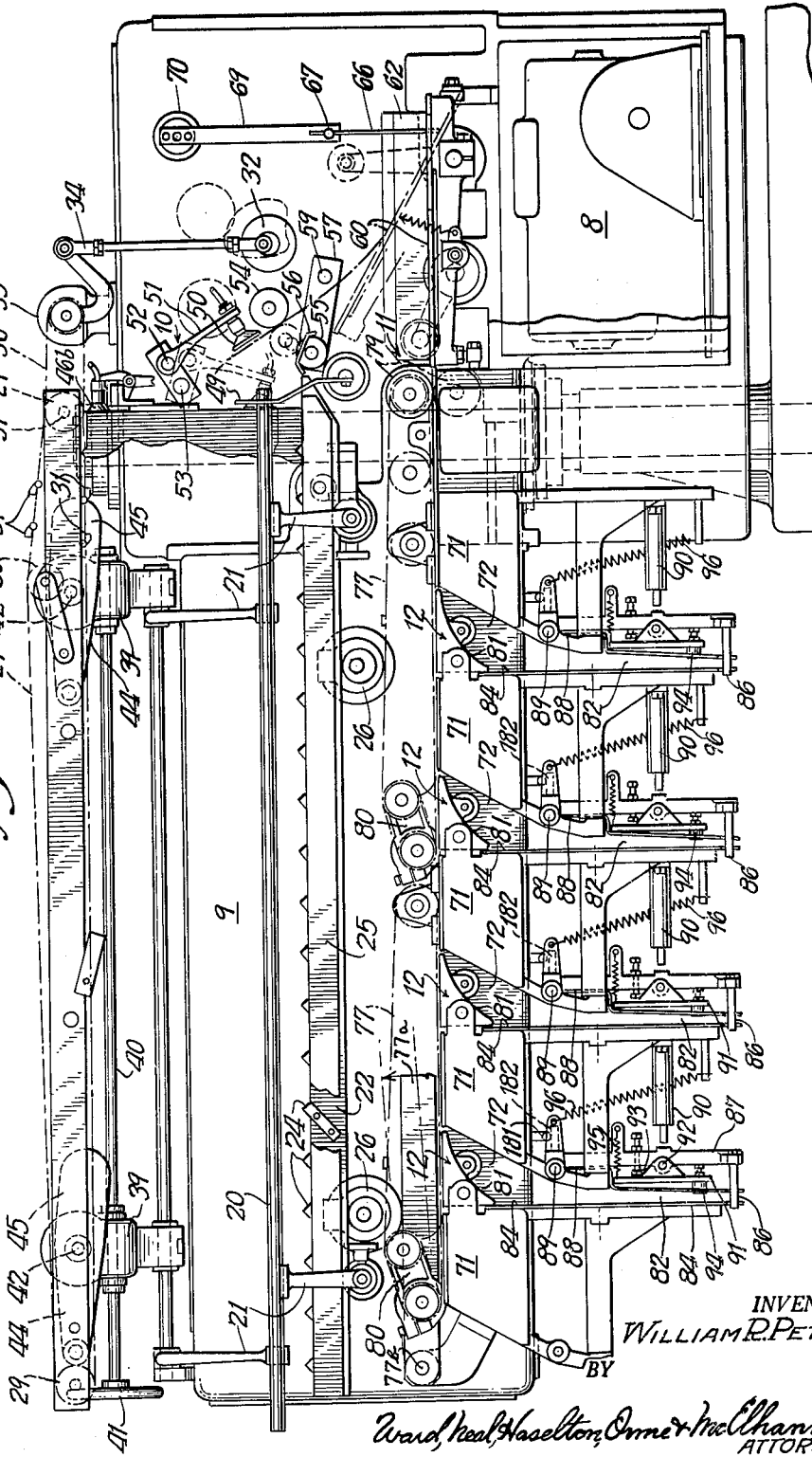

INVENTOR.
WILLIAM R. PETERSON.
BY
Ward, Neal, Haselton, Orme & McElhannon
ATTORNEYS.

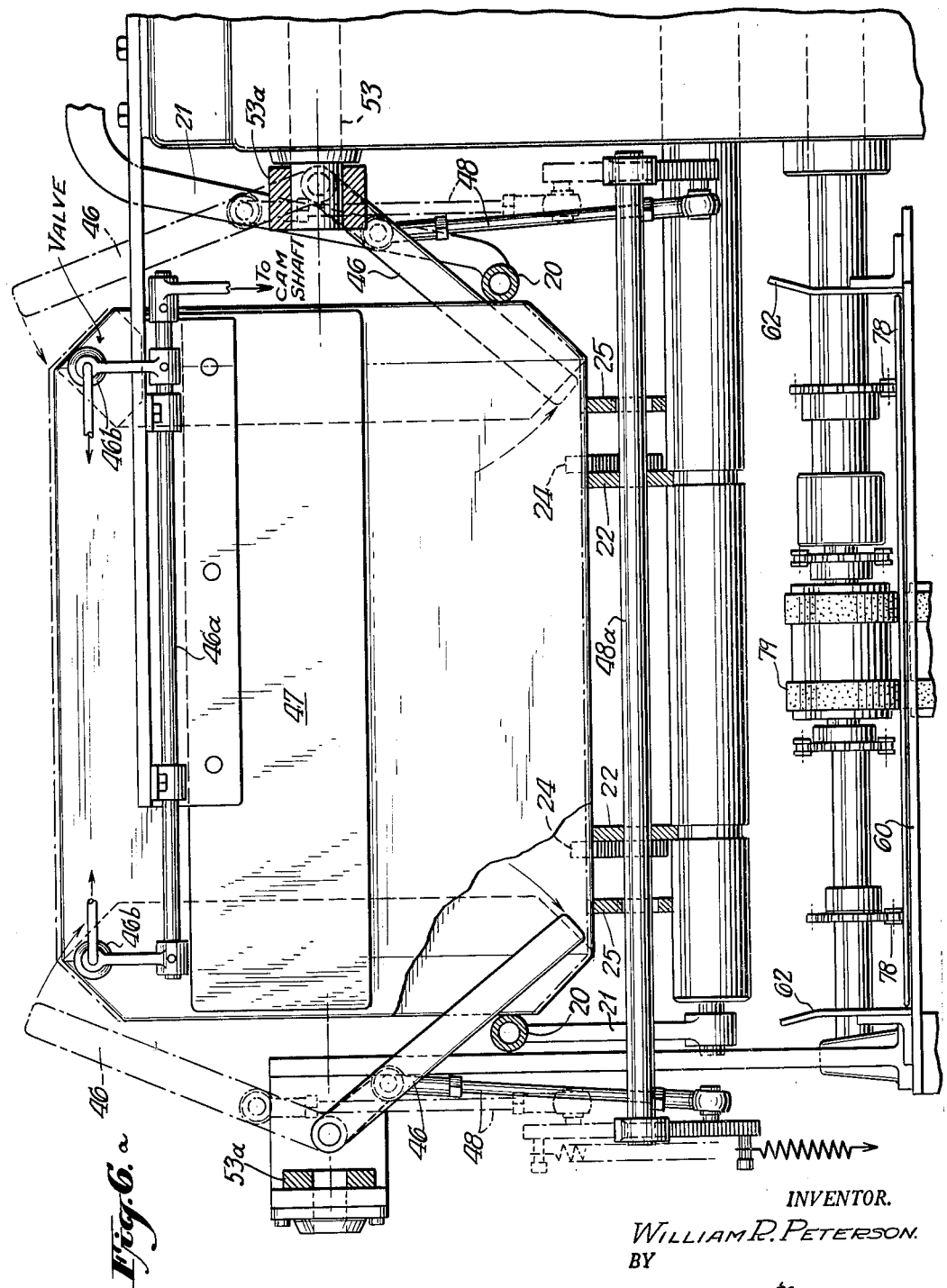

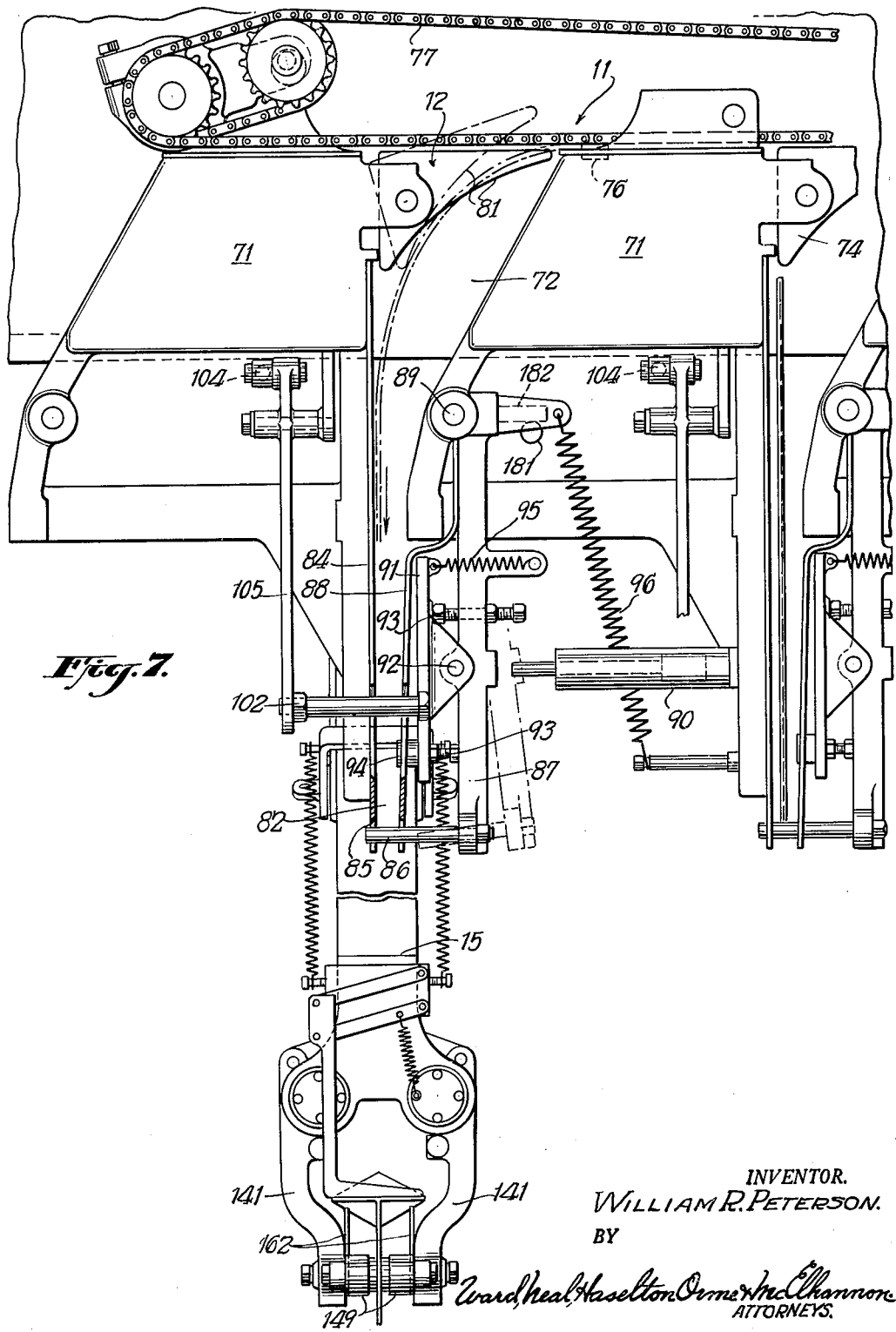

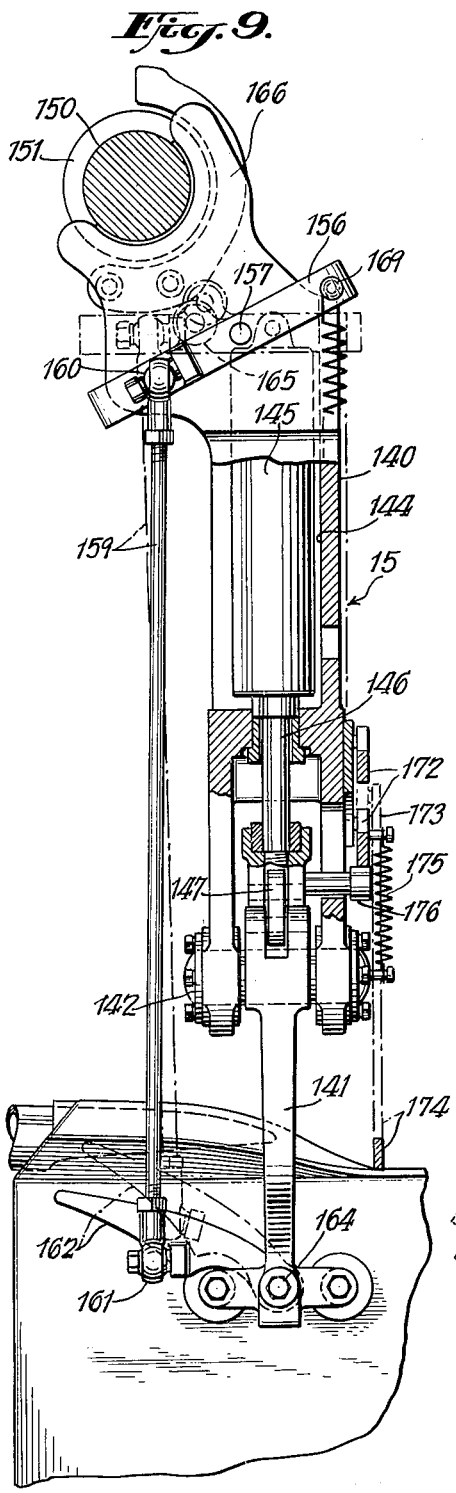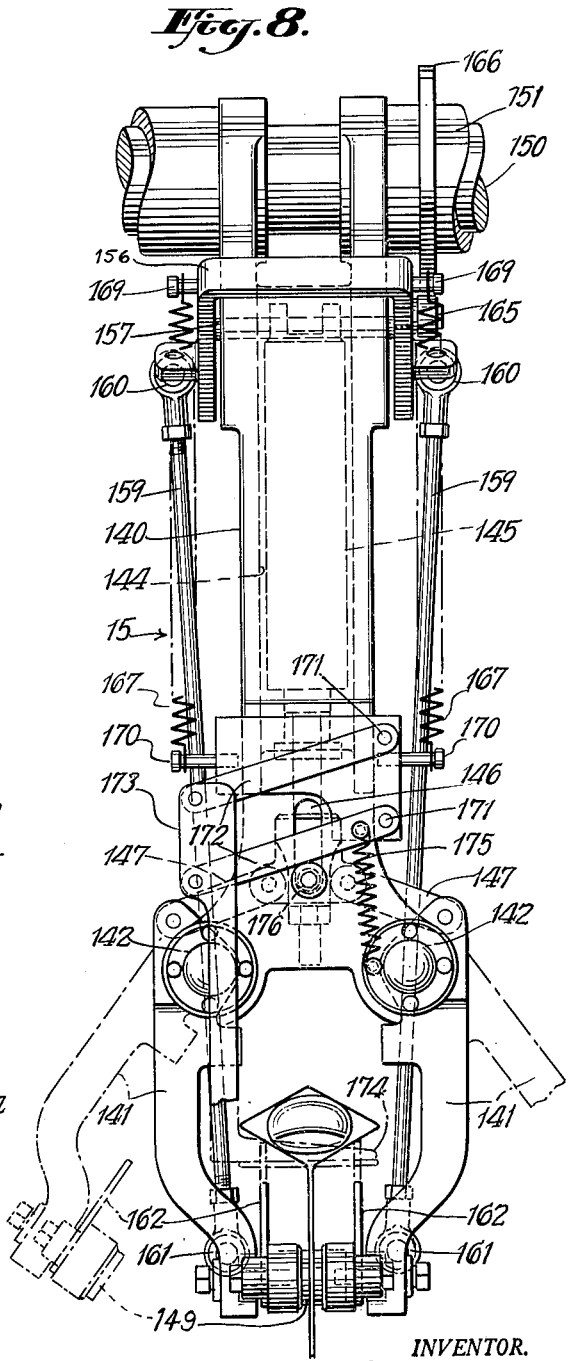

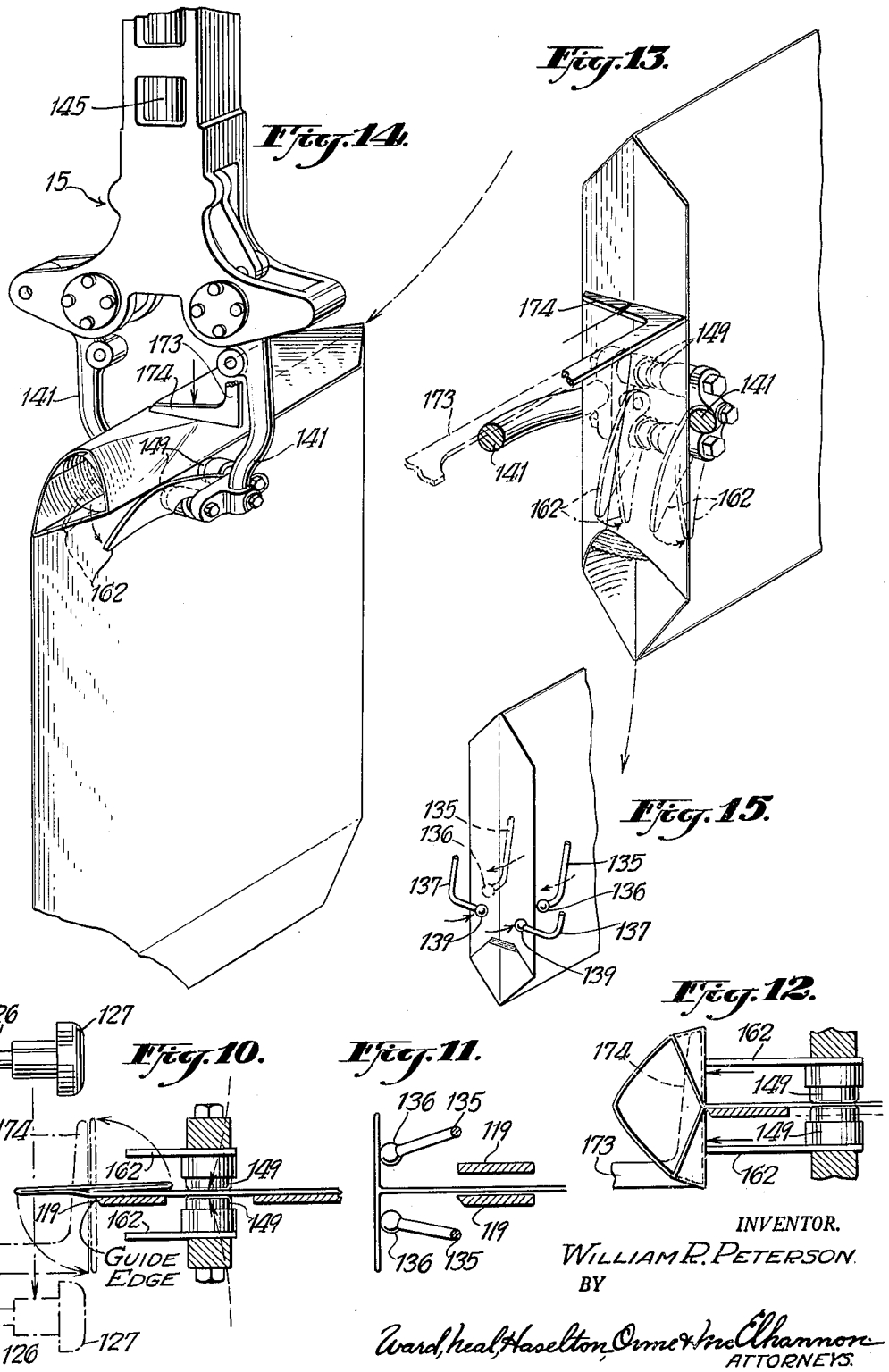

Oct. 26, 1965  W. R. PETERSON  3,213,588
AUTOMATIC VALVE BAG APPLICATOR
Filed March 2, 1961  10 Sheets-Sheet 10
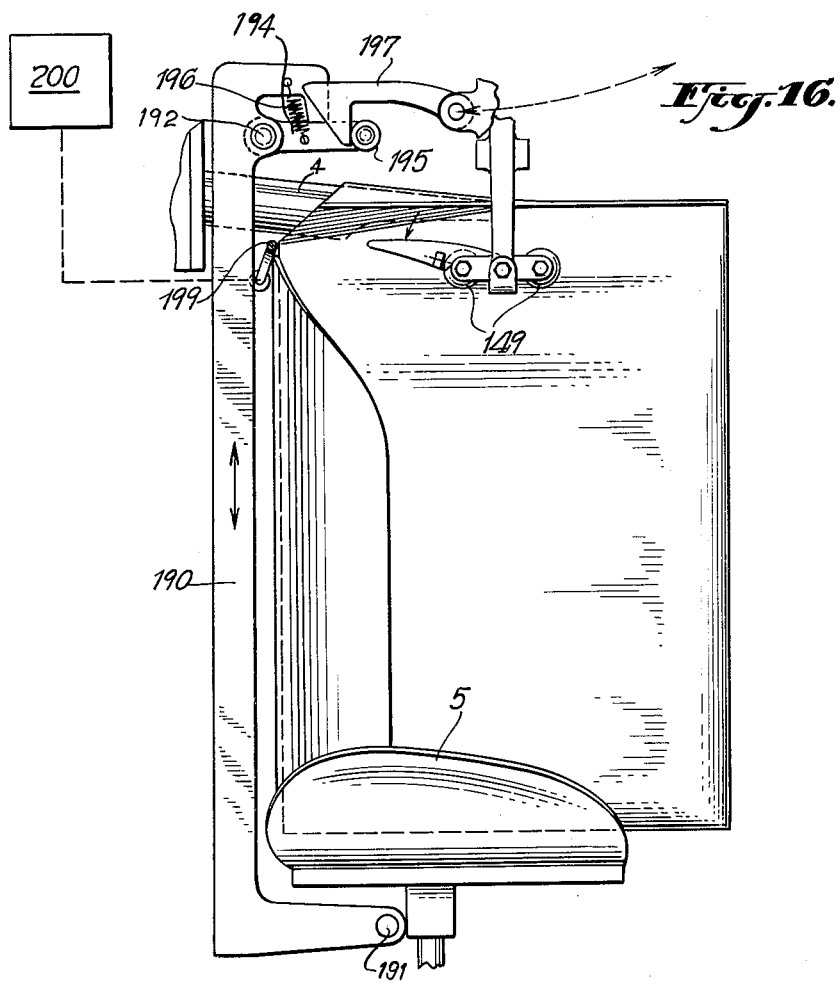
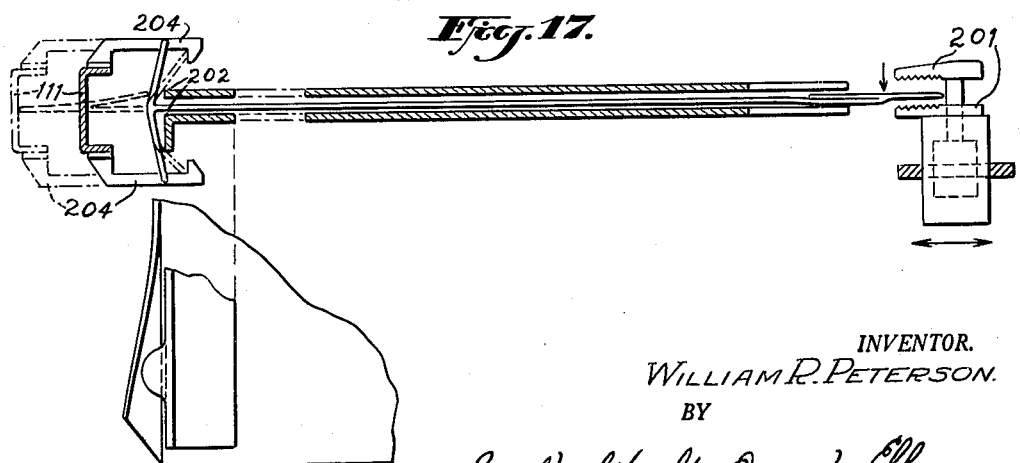
INVENTOR.
WILLIAM R. PETERSON.
BY
Ward, Neal, Haselton, Orme & McElhannon
ATTORNEYS.

United States Patent Office 3,213,588
Patented Oct. 26, 1965

3,213,588
AUTOMATIC VALVE BAG APPLICATOR
William Roy Peterson, South Attleboro, Mass., assignor to St. Regis Paper Company, New York, N.Y., a corporation of New York
Filed Mar. 2, 1961, Ser. No. 92,947
27 Claims. (Cl. 53—29)

This invention relates generally to material packaging and, more particularly, to a method and apparatus for automatically conditioning valve bags for application to filling tubes and then applying the bags to the tubes.

Heretofore, and since the development of the first commercially successful valve bag filling machines more than half a century ago, valve bags have been commonly applied to the filling tubes or spouts of such machines by hand. Four spouts was the maximum number that could reliably be serviced by a single operator, and output under favorable conditions ranged from 1200 to 1400 bags per hour with one operator. To increase production beyond this capacity required an exceptionally skilled operator. It is well known that cleaner bags are not possible unless there is a delay period after filling and flow cut-off to allow the inflated bag to release air and dust into the dust manifold of the packer prior to discharge of the filled bag. Therefore, faster means of bag application at the start makes possible some pick-up of time for the delay at the end of the bag cycle for the cleaner bags, and a uniform application of valve to tube is said to be desirable in reducing bag breakage from unequal bag clamp gripping. Actually, while this apparatus makes possible an increase of production with four tube packers to 1800 bags per hour, it has a potential in that 6 or 8 tube packers may be made that can be serviced by a single automatic applicator with one attendant which will greatly increase production at no extra cost. It will be understood that the applicator of the present invention can be utilized to apply any known type of valve bags, such as sewn seam or end flap bags.

Thus, I have conceived by my invention a novel construction and method of operation that enables me to feed valve bags automatically from a supply thereof to one or a number of filling spouts, conditioning each bag valve for reception of a spout and then actually mounting each bag by its valve on a spout for filling. The automatic characteristics of the invention enable a single operator to service six or eight spouts thereby increasing production per man sufficiently to permit the desired time delayed discharge of the bags from the filling spouts whereby to prevent dusting and to assure substantially uniform weights, while still greatly increasing the overall output of filled bags per unit of time by the single operator.

In essence, my invention resides generally in the utilization of a bag supply magazine, means withdrawing individual bags from the magazine and delivering them to a rest station where they are acted upon by various elements to condition the valves therein for reception of a filling spout, and means delivering the bags from the rest station to the filling spout for reception thereof by the bag valve. The delivery, conditioning and positioning of the bags on the filling spout are performed in sequential steps and entirely automatically.

As a feature of my invention, the magazine includes several fixed rails for supporting the bags vertically in side by side relation and bag feed means which advance the bags towards an end of the magazine as they are withdrawn from that end. Actually, the bag feed means may comprise a plurality of movable rails mounted for movement relatively to the fixed support rails intermittently to engage and advance the bags. Control means are also provided which respond to movement of the advancing stack of bags to control operation of the bag feed means as the leading bags are withdrawn from the stack.

As a further feature of the invention, the means withdrawing the individual bags from the magazine may comprise vacuum cups with controlled suction for picking the leading bag from the stack and placing its lower edge at the nip of a pair of feed rolls causing the bag to be pulled from the magazine. In accordance with this feature of the invention, it is well to mention that during the manufacture of the bags themselves, small quantities of paste frequently find their way to the exterior surface of the bags, so that when the bags are stacked, there is a tendency for adjacent bags to become pasted together. In order to prevent the pick-off means from withdrawing more than a single bag from the magazine at a time, separator bars swing vertically between the first two bags just proir to each pick-off operation so as to break any bond which may exist therebetween.

As has been stated, the bags are delivered to a rest station where they are conditioned for mounting on a filling tube or spout. Actually, the present machine is capable of serving a plurality of filling tubes and there are provided rest stations for each of the tubes so served. After release by the vacuum cup pick-off device, the bags are moved along a table over the rest stations and deflectors are provided for guiding the bags from the table downwardly into vertical disposition in one of the rest stations. In the rest station, the respective bag valve is opened and means then shift the bag from the rest station to the filling spout served by the particular rest station while maintaining the valve in open position so as to receive the filling spout.

A further feature of the invention contemplates the provision of the means acting on the valve end of the bags while in each rest station to open the valve. Such means automatically perform a sequence of operations on the bag flap to open the valve where a valve bag is used. Thus, the end flap is pivoted to a position crosswise of the plane of the body of the bag, after which the portions of the flap adjacent the body are moved in a direction away from the bag bottom, thus to open the valve. The apparatus for performing these steps are sequentially operated by a main control unit. If sewn bags are used, other means are provided to condition the bags.

Still a further feature of the invention involves the utilization of a swing arm for each filling tube and rest station. Each swing arm includes clamping means at one end thereof and means are provided for grasping the body of the bag by the clamping means after the valve has been conditioned as aforesaid, and then shifting the bag from the rest station towards the respective filling spout while maintaining the valve in open condition to receive the spout. As the bag valve slides over the filling spout it actuates a switch for starting the filling operation. The usual scale saddle is provided beneath the bag so that when the bag reaches the desired weight, the scale beam is tipped, the filling operation is stopped and the bag is discharged from the filling spout.

The method of preparing the bags for filling is also within the contemplation of the present concept and, while the various steps of the method might be performed manually, by proper manipulation of a bag, nevertheless for regular and rapid handling and conditioning, the automatically operated equipment such as described herein is, of course, preferred.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is an overall end elevational view of apparatus in accordance with the present invention and which is here shown in relation to a valve bag packaging machine, and illustrating a bag in several positions during an operating cycle thereof;

FIG. 2 is a partial front elevational view of the bag applicator of FIG. 1 and illustrating several bags in various phases of handling;

FIG. 3 is a front elevational view illustrating details of portions of the apparatus shown in FIGS. 1 and 2;

FIG. 4 is a perspective view of an end of the magazine illustrating several of the bag handling elements in one position;

FIG. 5 is similar to FIG. 4, but illustrates the parts in another position;

FIG. 6a is a fragmentary end view illustrating components of the feed mechanism;

FIG. 7 is a fragmentary view of a portion of the applicator illustrating details of a rest station;

FIG. 8 is a plan view of a bag applicator arm showing the clamp arms or levers in closed position in solid lines and in open position in broken lines;

FIG. 9 is a side elevational view of an applicator arm partially broken away and illustrated applying a bag to a filling spout;

FIG. 10 is a diagrammatic plan view illustrating a bag in its rest station with the flap shown in solid lines in its initial position and in dotted lines in turned position, and also illustrating the position of the clamp levers on the bag body;

FIG. 11 is a view similar to FIG. 10, but showing the flap being further conditioned;

FIG. 12 is a view similar to FIGS. 10 and 11, but showing the valve open and conditioned for movement to the filling spout;

FIG. 13 is a perspective view illustrating the parts in the same positions as shown in FIG. 12;

FIG. 14 is a perspective view illustrating a bag supported by the applicator arm with valve held open and flap stabilized as it is about to receive the spout;

FIG. 15 is a schematic perspective view illustrating alternative means for acting on the bag flap; and FIG. 16 is a side elevational view of a bag in fill position and illustrating features of the applicator arm.

Figure 6:
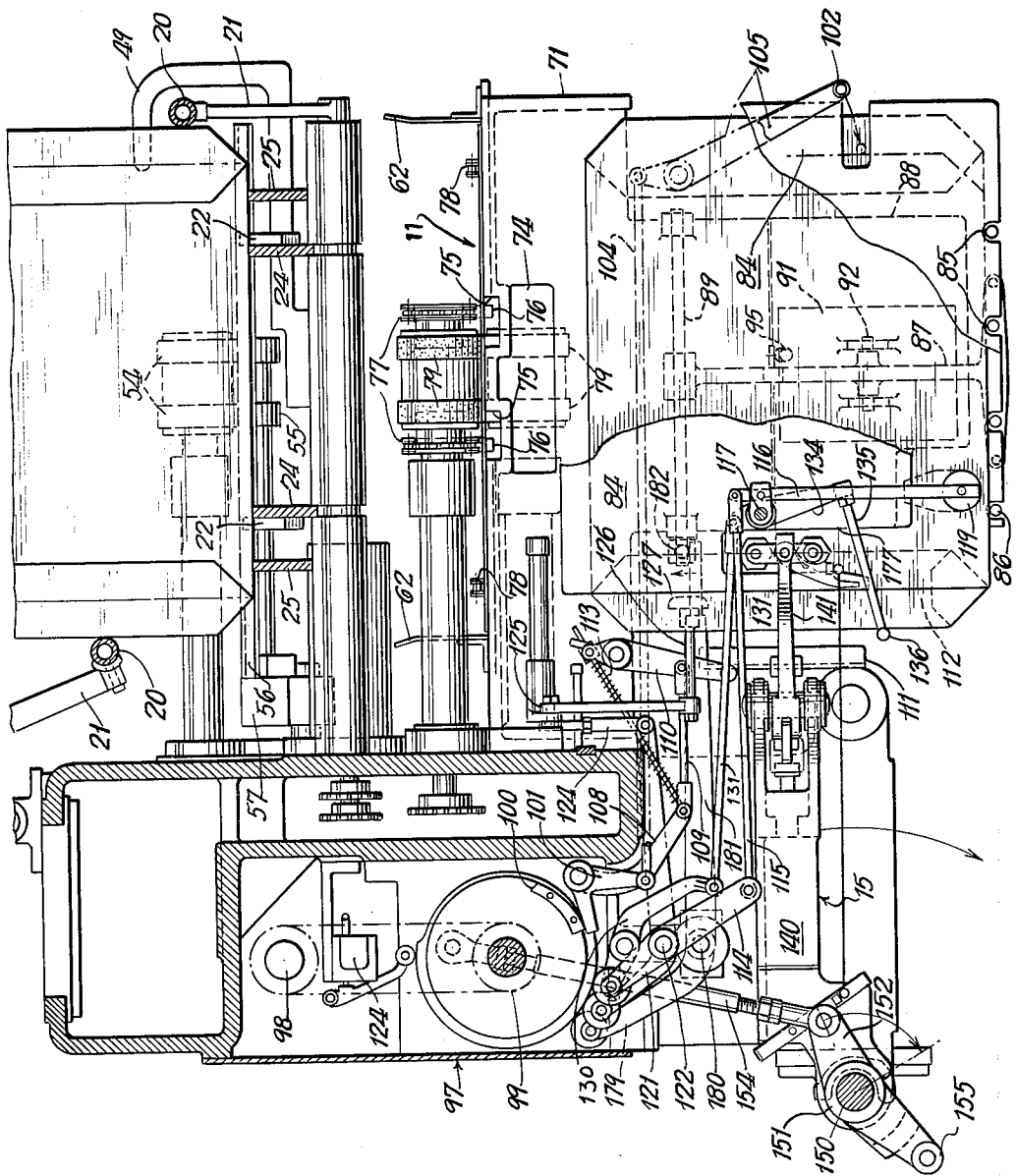
FIG. 6 is a cross-sectional view taken along the line 6—6 of FIG. 7.

Referring now to the drawings, and more particularly to FIG. 1 thereof, there is shown a packaging machine 1 of the type utilized for the packaging of dry divided solid materials, and having a material feeder 2 and supply bin 3. It will be understood that such packaging machines are often used in multiple, that is, positioned adjacent one another, and that each unit is equipped with a filling spout 4 and bag saddle 5 suitably associated with a scale beam (not shown) to weigh the bag being filled, cut off the filling operation, and discharge the bag when it reaches the proper weight. The apparatus thus far described does not constitute part of the present invention, but is broadly set forth to facilitate an appreciation of the present contribution and an understanding of the purposes and function of my invention.

As shown in FIGS. 1 and 2, I provide frame members 6 for supporting a housing 7 containing a main power source 8 (FIG. 3) and actuating and control mechanism for operating the various elements of the invention. Briefly, the overall construction and operation of the invention is as follows.

A number of valve bags, say six or seven hundred, are manually stacked in the magazine 9 so as to rest in side by side disposition one one of their longitudinal side edges and with their valves facing upwardly at the side of the machine adjacent the housing 7, as shown in FIG. 1. The bags are advanced to the right, as viewed in FIG. 2, by means which will later be described, and pick-off or bag withdrawal mechanism 10 (FIG. 2) removes the leading bag from the stack and delivers it to a horizontal cross feed table 11 along which it moves over a series of deflectors 12 which deflect individual bags, as needed, into one of several rest stations 14. The bags are maintained in vertical disposition while in these rest stations with their valves facing downwardly due to the manipulations of the bags en route to the rest stations. While supported securely in the rest stations, means to be described act on the bag valve flap to open the valve. A gripper or bag applicator arm 15 is provided for each rest station and clamps upon the bag in the respective station and, while maintaining the valve in open position, swings the bag towards the respective filling spout served thereby so that the spout is received within the valve. As the valve passes over the spout, it actuates a switch (not shown) which controls the filling mechanism; the bag is filled, weighed, and ejected from the spout by conventional means assisted by the applicator arm moving up to carry down a new bag. A deflector 12 for the rest station serving that spout opens so as to receive another bag.

The bag supply magazine 9 is best shown in FIGS. 1 to 3 and comprises a pair of horizontally disposed stationary side bag rails 20 at either side of the magazine and supported from the frame by brackets 21. The front rail 20 may be adjustable to permit the magazine to receive bags of various lengths. The base of the magazine, or means supporting the downwardly facing side edges of the bags, comprises a pair of parallel stationary bars 22 having spaced lugs 24 extending upwardly therefrom. The magazine is also equipped with at least two, and preferably three, parallel, longitudinally extending bars 25 carried by widely spaced eccentric cross shafts 26 which rotate in a clockwise direction, as viewed in FIG. 3. At the top of the magazine there is provided a bag retention and top feed unit comprising a pair of chains 27, only one of which is shown (FIG. 3), reeved about sheaves 29 at opposed longitudinal ends of the magazine and maintained under proper tension by a biased idler 30 acting on the upper run thereof. Each such chain 27 has a series of spaced latches 31 which engage the last bag in a group and keep the bags from falling backward, that is to the left, as viewed. The latches pivot upwardly on the lower chain run if bags are stacked beneath them. The chains inch the bags forward, being indexed in short strokes by an eccentric motion transmitted from a cam shaft 32 and an eccentric arm 34 acting through a unidirectional, free wheel sprag clutch 35 and a short drive chain 36 transmitting the driving motion from the clutch to a cross shaft 37 carrying the head sheaves 29. Actually this shaft drives the head sheaves 29 through self-compensating spring loaded ball slip clutches (not shown) which slip when the bags are pressed too tightly. By reason of this arrangement, each of the chains 27 may be moved manually in either direction to suit any odd condition in the loading of the bags. The entire top feed unit is adjustable vertically to allow for bags of different widths, and for this purpose self-locking worm and wheel units 39 are controlled through shaft 40 and hand wheel 41 to raise or lower the feed unit, rocking the same about pivots 42 to provide a parallel motion through arms 44. The unit is counterweighted at 45.

The bag top feed is arranged to operate in timed relation to the bottom feed oscillating bars 25 and the teeth 24 on the bottom stationary bars assist in retaining the bags in proper upstanding condition.

As has been mentioned, the bags are sometimes found to be pasted together because of small quantities of paste finding their way to the exterior bag surfaces; and provision is made for separating adjacent bags which may have become pasted together in order that the bags will be fed individually to the rest stations. Thus, as shown in FIGS. 4 and 6a, a pair of opposed separator arms 46 are mounted at the forward end of the magazine to pivot downwardly between the lead and next succeeding bags in timed relation to the pick-off cycle to separate the bags before the lead bag is picked off by the pick-off mechanism 10. Actually, these separator arms 46 may very well be driven through a linkage comprising a pair of drive rods 48 and cross shaft 48a which shaft may be operated by a cam (not shown) controlled by the master control unit. A further cam (not shown) is operated by the same control unit to rock a shaft 46a supporting spaced vacuum cups 46b (FIG. 6a) which engage and bend back the upper corners of the lead bag to insure passage of the arms 46 between it and the next succeeding bag in the stack.

As shown in FIGS. 2 to 4, a vertical plate 47 is supported at the forward end of the magazine. This plate stops the bags at a predetermined position as they advance towards the pick-off mechanism. A lever 49 (FIGS. 4 and 5) overlaps the front edge of the leading bag and extends across and beneath the magazine to the housing 7 in which it is pivotally supported. This lever 49 operates a micro-switch which starts and stops the magazine feed drive motor (not shown). Pressure against the lever stops the bag feed and, as the bags are withdrawn from the magazine, the pressure is relieved causing the lever to throw the switch and start the feed drive.

The pick-off mechanism 10 is best shown in FIGS. 3 to 5 and comprises a pair of spaced vacuum cups 50 fixed at the end of arms 51 carried by a pivot shaft 52 which is rocked by shaft 53 from which it is offset by opposed crank arms 53a in timed relation to the other operating parts of the machine. The shaft 52 rocks in a counterclockwise direction as viewed in FIG. 3 to shift the cups 50 away from the magazine, carrying the lead bag along with them. It will be noted that the cups are positioned to engage the bags somewhat above the lower edges thereof so that as the bag swings outwardly its lower edge is presented at the nip of upper pull rolls 54 and lower pinch roll 55. The upper pull rolls 54 are continuously rotating rubber faced rolls while the pinch roll 55 is carried by a frame 56 extending across the machine from a crank arm 57 mounted on a rock shaft 59. The shaft 59 is so timed relatively to the operation of the suction cups that the pinch roll 55 is brought up behind the rear face of a bag after it is peeled from the magazine and nips it against the continuously rotating rolls 54, as shown in FIG. 5, to deliver the bag to the surface of an inclined tilt table 60. The vacuum applied to the suction cups 50 is, of course, applied and relieved with proper timing to permit an easy transfer of the bags from the cups to the feed and pinch rolls.

The tilt table 60 is supported from a rock shaft 61 projecting from the housing 7 and arranged to rock the table from a horizontal position (FIG. 4) to an inclined position (FIG. 5) for receiving the lead bag as it is discharged from the nip of the pull and pinch rolls 54 and 55. The table is equipped with guide plates 62 and a centrally disposed clip 64 to assure proper positioning of the bag on the table; and a pair of slots 65 receive the ends of kick rods 66 hung from cross bar 67 which is in turn carried by an arm 69 secured to the end of a rock shaft 70. The action of the shafts 52 and 61 is so timed that, as stated, the table 60 is inclined to receive a bag from the rolls 54 and 55 after it has been picked off the stack. The table 60 is then pivoted to horizontal position and the kick rods 66 are ready to push the bag in the direction indicated by the arrow in FIG. 4 to the horizontal cross feed table 11.

FIGS. 3, 6 and 7 best illustrate the cross feed table 11 which comprises a series of brackets 71 having flat upper surfaces and projecting outwardly of the main frame of the machine. These brackets are spaced to provide slots 72 (FIGS. 3 and 7) therebetween for a purpose to be described. Each bracket pivotally supports one of the deflectors 12 at the upper end of the slot adjacent its front end and the top surface of the brackets and deflectors are grooved as at 75 (FIG. 6) to provide clearance for carrier lugs 76 which are connected to parallel chains 77. Lay chains 78 are also provided above the cross feed table 11 in position above the valve and bottom marginal regions of the bags to hold down any tendency of the bags to curl or wave. These chains index and run at the same speed as the bags thus insuring against side drag. The lay chains may be in two or more sections to reduce sag, if desired.

As shown in FIGS. 3 and 6, the end of the cross feed table 11 adjacent the tilt table 60 is equipped with two pairs of feed rolls 79 between which the bags are pushed by the kick rods 66 which rods may be controlled mechanically by cam action or by a solenoid responsive to discharge of a filled bag from a filling spout by the opening of a conventional bag clamp which serves to clamp the bag valve to the spout during filling. Thus, as any bag clamp on the packing machine opens, the rods 66 push a bag to the nip of feed rolls 79 for delivery to the cross feed table 11. The rods return to initial position when the bag clamp resets on a bag newly positioned on the spout.

The bags fed to the chains 77 by the rolls 79 are carried across the table towards the deflectors by the lugs 76 acting upon the rear edges of the bags. Actually, the bag stops momentarily after being ejected from the feed rolls until the lugs pick it up and advance it.

As shown in FIG. 3, the chains 77 are provided in two sections to minimize sag and the second (left hand) section picks up the bags delivered by the first section and advances them further. Both sections of chain are started and stopped under control of a master control unit (not shown). Idler take-ups 80 are provided for tightening each chain strand. Preferably, the uppermost of the rollers 79 is an idler and is driven by contact with the lower driven roller so that the chains 77 may be pivoted and lifted relatively to the table in the event that a bag becomes jammed as it is being carried across the table. For this purpose, the chains are carried on an independent frame 77a which may pivot about pivot shaft 77b to lift the chains relatively to the table 11.

The deflectors 12 are normally in their lower positions as shown in solid lines in FIG. 3, for example, to provide flat surfaces between the brackets 71. As the filling spouts require a bag, the respective deflector will pivot upwardly to the position shown in broken lines in FIGS. 3 and 7 thus to engage the leading edge of an advancing bag and guide it downwardly along a curved under-surface 81 of the deflector until the bag is clear of the horizontal cross feed table and is positioned vertically in a slot 82 which constitutes the rest station referred to hereinbefore. The deflectors may conveniently be operated by solenoids or mechanically by cams under supervision of the master control unit in which case a circuit breaker interlock system assures that only one deflector at a time will be in raised position.

Each bag slot 82 or rest station is formed by a fixed plate 84 on one side extending downwardly from the bracket 71 above it. As shown in FIG. 6, these plates have a series of spaced, inverted U-shaped recesses 85 along their lower edges for reception of bottom pins 86 against which the bags come to rest in the slots. The opposite side of each slot 82 comprises a vertical bar 87 pivoted from a shaft 89 carried by the adjacent bracket 71 and a stripper plate 88 loosely supported by the shaft 89 and movable under control of a cam driven by the appropriate tube control unit. The slots 82 are opened relatively widely for reception of the bags, so as to allow wavy or somewhat wrinkled bags to bottom properly against the pins 86. The slots are then partially closed or narrowed by movement of the plates 88 to shift and register the bags rather than buckle the paper as might happen if the slots were closed rapidly in a single step. The slots are then closed further when the bags are gripped for valve conditioning as will later be described, and at the end of the conditioning operations, the slots are opened wide to await the next bag. After the plates 88 partially close the slots, the bags come under control of pneumatic cylinders 90, the piston rods of which contact and swing the bars 87 about their respective shafts 89. These bars 87 carry plates 91 for movement about horizontal pivot pins 89 (FIGS. 3 and 7). The pressure plates 91 carry pads 94 containing rough grip belting or the like near their bottom edges and these pads engage the bags, moving through appropriate openings in the plates 88, and clamp them against the plates 84. Jack screws 93 and springs 95 are employed to adjust the plates 91 relatively to the bars 87. Additional springs 96 bias the bars 87 towards the slots 82. Thus, it will be seen that the air cylinder 90 controls the disposition of the mechanism for clamping the bags in the respective slots 82, the pins 86 being positioned to stop the incoming bags and to support them until they are clamped between the plates 84 and 91 by cam action controlled by the tube control unit for the respective tube acting through pins 181 which will be referred to hereinafter.

Referring again to FIG. 6, there is shown a portion of a filling tube control unit 97, one such unit being provided for each filling tube. These control units do not constitute a part of the present invention, but are illustrated here in order to assist those skilled in the art to understand the operation of the various elements of the invention. Actually, the control unit includes a conventional single revolution pin type clutch which revolves upon actuation of a built-in solenoid. The clutch makes a single revolution and stops and the output end of the unit carries a hub 99 on which are fastened several cams for controlling the operation of flap conditioning elements which act upon the bag while it is secured in the slot 82 in order to prepare the valve to receive the respective filling spout. These filling tube control units may be chain driven from a common drive shaft 98 extending along the length of the main frame and having a miter gear engaging a similar gear on a cross shaft in the main frame, which latter shaft is driven from the main drive.

Each filling tube control unit is provided with a cam 100 which rocks a crank 101 to shift a horizontally disposed pin 102 positioned adjacent the end of the bag opposite the valve end when the bag is in the slot 82. The crank 101 actuates the pin 102 through a link 104 and crank 105. This pin 102 thus pushes the bag in a direction towards the packer. At the same time, a cam on the main control unit also actuates a lever 108 which shifts a link 109 connected to a pivoted swing link 110 carrying a chute 111 positioned adjacent the valve end of the bag. Since the pin 102 and chute 111 are operated simultaneously, it will be seen that they both move towards the bag and, through a scissor-like action, position the bag in the slot 82 so that the flap crease or fold line 111a (FIG. 6) between the valve flap and the body of the bag is correctly positioned along the vertical straight edge 112 of the plate 84 thus assuring that all bags will be properly positioned in the slot 82 regardless of variations in the exact positions assumed by the bags as they drop into the slot from the cross feed table. After the pin 102 and chute 111 have positioned the bag, they are retracted out of contact with the valve flap, the chute 111 being so shifted by the spring 113 and the pin 102 by spring means (not shown).

Each filling tube control element has a further cam which acts upon a crank 114 to shift a pair of connecting rods 115 (only one of which is shown in FIG. 6), to operate two levers 116 (one on each side of the bag) pivoted as at 117 and carrying flap guides 119 at their lower ends. When a bag is dropped into the slot 82, the flap guides are positioned to permit to the bag to be registered relatively to the straight edge 112 as already described and serve to prevent the registering force exerted on the bag from folding the paper as when the bag end may be curled, for example. A conveniently disposed spring (not shown) retracts the guides 119 under cam control in order to permit the bag flap to be conditioned for receipt of the filling spout, as will now be described.

After the bag reaches the slot 82 and is shifted to achieve proper registration, a further cam on the fill spout control unit operates an air valve which extends the piston rod of the air cylinder 90 firmly to grip the bag between the plate 84 and pad 94, as has already been described.

As shown in FIG. 6, the filling tube control unit has a further cam which swings a lever 121 about a pivot 122 to shift a link 124 that in turn rocks a bell crank 125 to the lower end of which is connected a flap turning horizontal rod 126 (FIGS. 6 and 10) with a yieldable head 127 swingable along with the arm of the bell crank 125 to which it is connected. These elements are normally held in retracted position by suitable biasing means acting with the cam, to allow a bag to drop clear into the bag slot. However, after a bag is registered in the slot and gripped, the head 127 contacts the valve flap and turns it against the vertical straight edge 112 to a position at right angles to the bag body (FIG. 10). Continuing under the control of its respective cam, the head 127 holds the flap in this position until the valve is opened and then retracts to complete its cycle.

Referring now to FIGS. 6 and 11, the control unit has still a further cam acting on a cam lever 130 that operates two rods 131 (only one of which is shown), connected to levers 134 pivotally mounted on the same pivots 117 mentioned heretofore in connection with the flap guides 119, to shift valve opening levers 135 which are provided with smooth ball ends 136. These levers are normally in retracted position at the start of a control unit cycle. However, after the bag is properly registered in the slot 82, gripped under the action of the air cylinder 90 and has its flap turned to a position at right angles with respect to the valve body, as already described, the control unit cam moves the ball ends through the linkage just described to contact the undersurface of the flap beneath the valve. The ball surfaces are positioned relatively to the bag body to prevent inversion of the valves as they are urged by these ball ends towards the packing machine to force the valve to open, and these ball surfaces hold the valve open until the swing arm grippers move into place to take over control of the bag after which the ball levers are returned to their normal position under the action of a conveniently located spring.

At this point it is thought best to mention that, as an alternative, a further conditioning step may be utilized in conditioning the bag to open the valve. In this connection, attention is invited to FIG. 15 illustrating a bag at its rest station and with its valve flap already turned to form a T configuration with the bag body. In order to insure against the valve inverting, that is, assuming a V-shape instead of opening, means such as links 137 having enlarged ends 139 may be provided to act upon the outer surface of the valve flap and to swing or bend the flap into a concavo-convex configuration from a point of reference on the bag body before the ball ends 136 act upon the under surface of the flap beneath the valve to force the valve open as already described. This alternative conditioning step in effect provides a toggle-like arrangement which assures that the valve will not invert. The utilization of the links 137 and their enlarged ends 139 are useful in many cases, but have been found to be unnecessary in some cases depending upon the condition of the bags being employed. It will be understood, of course, that if the links 137 are used, they may readily be actuated and timed by a cam added to the fill tube control units and by connecting linkage much as those already described.

It has already been stated that gripper or bag applicator arms 15 are provided for each rest station to clamp upon the bag and, while maintaining the valve in open position, swing the bag towards the respective filling spout served thereby so that the spout is received within the bag valve. As best shown in FIGS. 8 and 9, these gripper or bag applicator arms 15 each comprise a shank 140 and a pair of gripping levers 141 pivoted as at 142 to an end of the shank 140. The shank 140 is bored or recessed as at 144 for reception of a double acting pneumatic cylinder 145 positioned therein and having its piston rod 146 connected to each of the levers 141 through toggle links 147. From the descriptions thus far, it will be seen that upon protraction and retraction of the piston rod 146, the levers 141 will pivot outwardly away from one another, and inwardly toward one another, respectively. The levers 141 are provided at their free ends with opposed facing rubber pads 149 (FIG. 8), for a purpose to be described.

Referring again to FIG. 6, it will be seen that the bag applicator arm 15 is mounted at one end for pivotal movement on a shaft 150. All four of the bag applicator arms 15 are supported on this shaft by sleeves 151 each of which carries a lever 152 connected at one end to an arm 154, the other end of which is in turn connected to the respective control unit 97 for the particular filling tube being serviced. Thus, the control units, acting through the arms 154, serve to oscillate the lever 152 and the sleeves 151, and therefore also the bag applicator arms 15 between the position illustrated in FIG. 6 and a position 90° therefrom in a clockwise direction, as viewed. The weight of the applicator arms may be offset by counterweights 155 carried by the levers 152 on the side of the shaft 150 opposite its connection to the arm 154. Incidentally, these counterweights may be used as operating handles in manually adjusting the position of the applicator arms.

Again turning to FIGS. 8 and 9, it will be seen that the shank 140 of the applicator arm 15 carries a yoke 156 by means of a pivot pin 157. The free ends of the yoke support elongate rods 159 by ball joints 160, the rods extending along the length of the applicator arms and being connected at their opposite ends through ball joints 161 to fingers 162 that are pivotally connected to the respective levers 141, as at 164. The yoke 156 has a cam follower 165 which bears against the cam surface of a fixed cam 166. Accordingly, as the bag applicator arm 15 is moved through an angle of 90° by the fill tube control unit 97 acting through the arm 154, and the lever 152, the cam follower 165 controlled by the cam 166 pivots the yoke 156 about its pivot 157 wherefore the fingers 162 at the ends of the rods 159 remote from the yoke follow the cam action and move between the positions shown in solid and broken lines in FIG. 9 under the influence of the cam 166 and a pair of springs 167 connected at one end to pins 169 at the end of the yoke opposite the ball joints 160, and at the other end to fixed pins 170 carried in the body of the shank 140.

The shank also carries pins 171 which support similar bars 172 for pivotal movement thereabout. The bars 172 are connected at their ends opposite the pins 171 to an elongate stabilizer bar 173 carrying a foot 174, the pins 171, bars 172, and points of connection of the bars 172 and the stabilizer bar 173 constituting a parallel motion mechanism. A spring 175 is connected at one end to one of the bars 172, and at its other end to a fixed point on the applicator arm 15 to urge the stabilizer bar in a direction towards the levers 141. The piston rod 146 of the pneumatic cylinder 145 carries a pin 176 which abuts one of the levers 172, shown in FIG. 8. Thus, as the piston rod is retracted, the stabilizer bar 173 is moved in a direction away from the levers 141, and as the piston rod is protracted, the spring 175, acting through the parallel motion mechanism pulls the bar 173 in a direction towards the links 141, for a purpose to be described.

Shifting of the bag applicator or gripper arm 15 relatively to the shaft 150 by means of the filling tube control unit acting through the arm 154 and lever 152, and actuation of the clamping levers 141 under the influence of the pneumatic cylinder 145 are so timed that the arm 15 is in its raised position, as shown in FIGS. 6 and 13 and the levers 141 come together to grip a bag between the rubber pads 149 at the free ends thereof after the valve conditioning elements already described have acted upon the bag flap to open the valve. In other words, after a bag has been positioned in a slot 82, and has had its flap acted upon by the head 127 to turn the same crosswise to the plane of the bag body, and after the flap has been acted upon by the ball ends 136 of the arms 135, to open its valve, the respective applicator arm 15 is brought into the position shown in FIG. 6, and its pneumatic cylinder 145 is actuated to bring the levers 141 into bag gripping position as shown in solid lines in FIG. 8 securely to grasp the bag body at a position just inwardly of the valve flap. For this purpose, the plate 84 constituting one side of the slot 82 is provided with a recess as at 177, as shown in FIG. 6.

Referring now to FIGS. 6 and 7, after the bag is securely gripped or clamped between the ends of the levers 141, a cam on the fill tube control unit 97 actuates a lever 179 which is pivoted at 180 to shift a further lever 181 and lift a pin 182 adjacent the extreme end thereof. As best shown in FIG. 7, the pin 181, upon being lifted, rocks the bar 87 about its shaft 89 and withdraws the pins 86 from the slots 85 in the plate 84 constituting one side of the slot 82, and also withdraws the pad 94 from clamping engagement with the bag. It will be recalled that these pins 86 defined the bottom of the slot against which the bag came to rest when admitted to the slot by its respective deflector 12. At this point it will be seen that the bag is now entirely under the control of the bag applicator arm 15.

As the bag applicator arm 15 is elevated to its horizontal position as shown in FIG. 6, the yoke 156 is rocked about its pivot 157 by the action of the cam follower 165 on the cam surface 166 thus shifting the arms 159 and the fingers 162 at the ends thereof so that the fingers clear the valve flap and then move upward to take over the function of the ball ends 136 of the levers 135 in holding the valve in the open position. The levers 135 may then be retracted, as described, under control of their operating cam on the fill tube control unit. Additionally, as the pneumatic cylinder piston rod 146 is protracted to bring the clamp arms or levers 141 together to grip the bag, the pin 176 permits the spring 175 to act upon the parallel motion arrangement heretofore described so as to bring the foot 174 on the stabilizer bar 173 down across the surface of the bag flap behind the open end of the valve in order to stabilize the flap relatively to the bag body.

With the bag thus controlled by the applicator arm 15, the valve held open by the fingers 162, and the valve flap stabilized by the foot 174, the fill tube control unit 97 then effects movement of the applicator arm 15 in a clockwise direction as viewed in FIG. 6, to swing the same, and the bag gripped thereby, downwardly towards the respective filling spout 4 (FIGS. 1, 2, 9 and 14) so that the open bag valve slides over the tube. In the event that the fill tubes being utilized are of the type known in the art as the "clean flow" tubes, it is necessary to shift the fingers 162 so as to permit them to clear the sides of the fill tube after the tube has commenced to enter the valve. For this purpose, the fixed cam 166 may be so shaped as to permit such shifting of the fingers for clearance at the proper time in the cycle of movement of the applicator arm 15.

As the valve slides over the filling spout, it contacts a switch arm 199 which actuates a micro-switch 200 (FIG. 16) which in turn causes a scale lock cylinder (not shown) to function to allow the packer scale beam to tilt to raise the fill tube to filling position. This electrical impulse causes a solenoid to act to clamp the bag to the spout. The pneumatic cylinder 145 is then retracted thus opening the levers 141 and withdrawing the foot 174. At the same time, the deflector control mechanism may be actuated to lift the appropriate deflector 12 serving the previously employed slot to call for a further bag for that slot. As the tube control unit completes it cycle, the appropriate cam acts to bring the pins 86 again across the bottom of the slot 82 and into the recesses 85 in the plate 84 to provide a bottoming surface for the bag about to be delivered.

It will be appreciated that while the bag is being filled, its bottom may be supported by a conventional saddle 5 mounted on a scale beam in known manner so that when the bag reaches the desired weight, the beam is tripped and the saddle normally tilts, removing the bag from its filling spout and depositing it on to a conveyor. However, as some filled bags discharge in a sluggish fashion, the gripper arm 15 may have a safety free-pivoting hook latch 197 (FIG. 16) that hooks behind a pin 195 on an extending discharge arm of each filling tube. On the upward motion to obtain a new bag from the rest slot the hook latch acts to insure that the filled bag is discharged in a manner to be described soon enough so the next bag can be applied.

When the bag is filled and the beam tripped, a timer effects a predetermined delay after which an electrical impulse operates a solenoid to open the bag clamp; a further solenoid actuates the tube control unit so that the swing arm is raised to positively discharge the bag in a manner to be described; and a further solenoid actuates the master control unit to operate a deflector 12, kick rods 66 and the feed chains 77. Actually, the particular deflector 12 which is thus operated is that which serves the last tube but one which filled a bag so that a lag of one operation exists between filling and receiving a new bag in the slot to allow time for the parts to properly orient themselves.

Turning to FIG. 16, a bag is shown in its saddle 5 and mounted on the fill tube 4. The packer frame carries a member 190 pivoted at 191 and itself carrying a pivot 192 at its upper end. A finger 194 supported by the pivot 192 carries a pin 195 and a spring 196 urges the finger upwardly. The applicator arm 15 carries a latch 197 freely pivoted thereon which rides up and over the pin 195 when the arm brings a bag to the spout 4. A switch actuator arm 199 is positioned beneath the tube 4 and operates a micro-switch 200 when the bag slides over the tube and pushes against the rod. It is this micro-switch that operates the scale lock cylinder allowing the scale beam to tilt to bag filling position and raising the fill spout to fill position while also effecting clamping of the bag to the spout, as already mentioned.

As has been stated, sewn bags may also be applied to fill spouts by this machine, in which case I prefer to mount suction cups on the applicator arms to engage the bag body adjacent the valve and draw the opposed bag faces apart. The valve is thus maintained open while the arm swings the bag towards the spout. In such cases, of course, the bag flap conditioning elements described in connection with flap end bags are dispensed with. The operation of these suction cups will be readily understood when it is mentioned that they may be pivoted on the applicator arms by yokes having cam followers actuated by open faced cams in a manner similar to the operating mechanism used for the fingers 162. A cam actuated air valve controls the suction at the cups.

It will be understood that the elements described for conditioning the end flaps of bags having such flaps are preferred for that operation, but that the present novel concept includes other means such as elements 201 (FIG. 17) for gripping the bottom of the bags, such elements, for example, being associated with the pins 102 which assist in registering the bags in the slots 82, and operating to pull the bags in a direction away from the packer after it is registered with its valve flap end extending beyond a pair of closely spaced vertical members 202 at that end of the slot. When the bag is thus pulled, the vertical members are contacted by the flap and serve to turn same and then snap the valve open. As a further alternative, the chute 111 may have hook-like arms 204 which override the flap ends when the bag is being registered and which act to snap the valve open when the chute is retracted, the bag then being clamped in its slot. Still a further means of opening the valve of a flap type valve bag may comprise suction or pin means, for example, to draw the outer surface of the flap outwardly to bring the valve to an open position.

The applicator thus described, and comprising four deflectors, rest stations and applicator arms, is so timed that the bags are delivered, conditioned, and mounted on the fill tubes in sequence, although it would be quite possible to have each of these operations take place as controlled by the actual filling time of each bag or simultaneously for all four tubes, in the latter case a single control unit for the four applicator arms could be used.

It will be appreciated that in the event that a bag is, for one reason or another not properly mounted on its spout, as for example where the inside of the valve has been pasted closed during the manufacture of the bags, so that the valve cannot be opened; or where the bags are mounted in the magazines with the flaps on the wrong side of the valve body; or where the bags are mounted in the magazine with the flap at the wrong end; the valves, upon being delivered to the spout by the applicator arm may trip the micro-switch momentarily only so that the material to be packaged will not flow through the spout. Instead the applicator arm upon reaching the end of a downward stroke will merely open to drop the bags, the micro-switch contact thus being broken. In order to fill and continue to fill a respective bag, contact of the switch must be held by the bag. Additionally, in the event that two bags are pasted together and are brought to the rest station, both flaps will be turned, but only one valve will be opened and, while both bags will be delivered to the spout the one with the open valve will admit the spout and the other bag will be dropped when the applicator arm levers are opened.

A bag feed master control unit is provided which does not per se constitute a part of the present invention and so has not been shown, but a brief description of which will be helpful in understanding the present invention. This unit is basically the same as the fill tube control unit 97 and its output end has a cam to control the vacuum utilized at the cups 50. It has a drive to a cam shaft for rocking the vacuum cups, the pinch roll and tilt table, and it drives the cross feed table indexing bag carrier chains. It also controls the glue breaker, its vacuum cup arm and vacuum air control and the bag infeed kick rods. Such a unit comprises a single revolution clutch which engages and revolves once for each bag handled. A pair of gears provide a quarter turn at a time of a cam having four lobes working in conjunction with four micro-switches, only one lobe and one switch being in engagement to turn the switch on at one time. This, with a tie-in electrical circuit provides a repeating sequence of operations whereby as a tube cycle starts upon discharge of a filled bag, the master control clutch revolves setting up the next bag delivery. Thus, a cycle bag is taken from the magazine and a bag feeds to one of the slots to replace the one just used.

From the foregoing description it will be seen that I contribute by my invention a method and apparatus for automatically conditioning valve bags for application thereof to filling tubes, and for then applying the valves to the tubes in a manner and by means which provide increased production at reduced labor costs and without sacrificing the desirable time delay to permit uniform weight and a clean operation.

I believe that the construction and operation of my novel valve bag applicator will now be understood and that the advantages of my invention will be fully appreciated by those persons skilled in the art.

I now claim:

1. A method of conditioning bags having a body and a valved end flap, comprising: sequentially positioning individual bags from the supply to a position in registry with a filling spout pivoting the flap to a position substantially at right angles to the plane of the bag body, shaping the flap to a generally concavo-convex configuration from a point of reference on the bag body, and urging portions of the flap adjacent the body in a direction away from the body thus to open the valve, and shifting the bag relatively to said filling spout while supporting the valve in open position to situate an end of the spout within the bag.

2. A method of conditioning bags having a body and a valved end flap, comprising: pivoting the flap to a position substantially at right angles to the plane of the bag body, shaping the flap to a generally concavo-convex configuration, urging portions of the flap adjacent the body in a direction away from the bag body thus to open the valve, and shifting the bag relatively to a filling spout while supporting the valve in open position to situate an end of the spout within the bag.

3. A method of conditioning bags having a body and a valved end flap, comprising: clamping the bag body in rest position pivoting the flap to a position substantially at right angles to the plane of the bag body, swinging the flap to a generally concavo-convex configuration from a point of reference on the bag body, urging portions of the flap adjacent the body in a direction away from the bag body thus to open the valve, grasping the valve body by shiftable means, unclamping the bag body and shifting the shiftable means and bag relatively to a filling spout while supporting the valve in open position to situate an end of the spout within the bag.

4. A method of conditioning bags having a body and a valved end flap, comprising: providing a supply of bags, clamping the bag body in vertical position, pivoting the valve flap to a position crosswise of the plane of the bag body, swinging the longitudinal marginal regions of the flap towards the bag body, and moving portions of the flap adjacent the body in a direction away from the bag body thus to open the valve, grasping the valve body by shiftable means, unclamping the bag body and shifting the shiftable means and bag relatively to a filling spout while supporting the valve in open position to situate an end of the spout within the bag.

5. In apparatus of the class described for conditioning valve bags having end flaps, means supporting a bag in rest position, means moving relatively to the bag in such rest position engaging and pivoting the bag end flap to a position crosswise of the plane of the body, means swinging the longitudinal marginal regions of the flap in a direction towards the bag body, and means moving portions of the flap adjacent the body in a direction away from the bag bottom thus to open the valve.

6. In apparatus of the class described for conditioning valve bags having end flaps, means supporting a bag in rest position, means pivoting the bag end flap to a position crosswise of the plane of the body, means swinging the longitudinal marginal regions of the flap in a direction towards the bag body, means moving portions of the flap adjacent the body in a direction away from the bag bottom thus to open the valve, and clamp means engaging the bag intermediate its valve end and bottom and shifting the bag relatively to a filling spout while the valve is supported in its open position to situate an end of the spout within the bag.

7. In a bag applicator of the class described for applying a valve bag to a filling spout, a bag rest station, means positioning a bag in said rest station, means acting on the bag at said rest station to open the valve therein, and clamp means gripping the bag body from opposed sides thereof and shifting same towards a filling spout while maintaining said valve in open condition to receive the spout.

8. In a bag applicator of the class described for applying a valve bag to a filling spout, a bag rest station, means positioning a bag in said rest station, means acting on the bag at said rest station to open the valve therein, an applicator assembly including clamp arms movable to grip the bag body in said rest station, means shifting said assembly and bag towards the filling spout, and means carried by said assembly for engaging the flap to maintain said valve open when said arms grip the bag body, wherefore said valve receives the spout as it moves towards same.

9. In apparatus of the class described, a bag applicator assembly for gripping a valve bag and applying it to a filling spout, comprising: a frame, opposed clamp arms carried by said frame and movable to and from bag gripping position, reciprocating fingers depending from said opposed clamp arms when engaging the flap of said valve bag, control means associated with said frame and effective to shift said clamp arms to and from bag gripping position, means retaining said control means against movement to shift said clamp arms when said arms are in bag gripping position, and means effective to shift said clamp arms from bag gripping position when the valve is in a selected position relatively to the spout.

10. In apparatus of the class described, a bag applicator assembly for gripping a valve bag and applying it to a filling spout, comprising: a frame, means mounting said frame for pivotal movement, opposed clamp arms pivotally mounted on said frame and movable to and from bag gripping position, a control member carried by said frame and shiftable relatively thereto, links connecting said control member and said clamp arms to pivot said arms upon shifting of said control member, means shifting said control member to bag gripping position when said frame is in a selected pivotal position, and means shifting said control member upon movement of said frame to a second selected pivotal position, thus pivoting said gripper arms from bag gripping position.

11. In apparatus of the class described, a bag applicator assembly for gripping a valve bag and applying it to a filling spout, comprising: a frame, opposed clamp arms carried by said frame and movable to and from bag gripping position, means carried by said clamp arms for retaining the valve of a bag gripped thereby in open position to receive a filling spout, control means associated with said frame and effective to shift said clamp arms to and from bag gripping position, means retaining said control means against movement to shift said clamp arms when said arms are in bag gripping position, and means effective to shift said clamp arms from bag gripping position when the valve is in a selected position relatively to the spout.

12. In apparatus of the class described, a bag applicator assembly for gripping a valve bag and applying it to a filling spout, a frame, means mounting said frame for pivotal movement, opposed clamp arms pivotally mounted on said frame and movable to and from bag gripping position, means carried by said gripper arms for retaining the valve of a bag gripped therebetween in open position to receive a filling spout, a control member carried by said frame and shiftable relatively thereto, links connecting said control member and said clamp arms to pivot said arms upon shifting of said control member, means shifting said control member to bag gripping position when said frame is in a selected pivotal position, and means shifting said control member upon movement of said frame to a second selected pivotal position, thus pivoting said gripper arms from bag gripping position.

13. In apparatus of the class described for applying a valve bag to a filling spout, a bag rest station, means positioning a bag in said rest station, means acting on the bag at said rest station to open the valve therein, and a bag applicator assembly comprising a frame, means moving said frame relatively to said rest station, opposed clamp arms carried by said frame and movable to position to grip the bag in said rest station, control means associated with said frame and effective to shift said clamp arms to and from bag gripping position, means retaining said control means against movement to shift said clamp arms when said arms are in bag gripping position, and means effective to shift said clamp arms from bag gripping position upon movement of said frame to position the bag valve on the filling spout.

14. In apparatus of the class described for applying a valve bag to a filling spout, a bag rest station, means positioning a bag in said rest station, means acting on the bag at said rest station to open the valve therein, and a bag applicator assembly comprising a frame, means moving said frame between two selected positions relatively to said rest station, opposed clamp arms carried by said frame and movable to position to grip the bag in said rest station when said frame is in one of said selected positions, control means associated with said frame and effective to shift said clamp arms to and from bag gripping position, means associated with said frame retaining the bag valve in open position during movement of said frame between one and another of said selected positions, and means actuating said control means to permit same to shift said clamp arms from bag gripping position upon movement of said frame to the other of said selected positions to situate the bag valve on the filling spout.

15. In apparatus of the class described for applying a valve bag to a filling spout, a bag rest station, means positioning a bag in said rest station, means acting on the bag at said rest station to open the valve therein, and a bag applicator assembly comprising a frame, means moving said frame between two selected positions relatively to said rest station, opposed clamp arms carried by said frame and movable to position to grip the bag in said rest station when said frame is in one of said selected positions, control means associated with said frame and effective to shift said clamp arms to and from bag gripping position, stabilizer means carried by said frame and movable upon operation of said control means to engage and stabilize the bag end flap, means associated with said frame retaining the bag valve in open position during movement of said frame between one and another of said selected positions, means actuating said control means to permit same to shift said clamp arms from bag gripping position upon movement of said frame to the other of said selected positions to situate the bag valve on the filling spout, and means operable to shift said stabilizer means out of stabilizing position upon movement of said control means to shift said clamp arms from bag gripping position.

16. In apparatus of the class described for applying a valve bag to a filling spout, a bag rest station, means acting on a bag in said rest station to open the valve therein, and a bag applicator assembly comprising a frame, means moving the frame between two selected positions relatively to said rest station, opposed clamp arms carried by said frame and movable to and from bag gripping position, control means moving said arms to bag gripping position when said frame is in one of its selected positions, means also operable by said control means to engage and stabilize the bag upon movement of said clamp arms to bag gripping position, said control means being operable to move said clamp arms out of bag gripping position when said frame is in another of its selected positions, and means operable upon movement of said clamp arms to release the bag to shift said stabilizing means out of engagement with the bag.

17. In apparatus of the class described for applying a valve bag to a filling spout, a magazine supporting a plurality of bags, a bag rest station, means withdrawing bags individually from said magazine and advancing them towards said rest station, means positioning the bags individually in said rest station, means acting on the bag at said rest station to open the valve therein, and a bag applicator assembly comprising a frame, means moving said frame relatively to said rest station, opposed clamp arms carried by said frame and movable to position to grip the bag in said rest station, control means associated with said frame and effective to shift said clamp arms to and from bag gripping position, means retaining said control means against movement to shift said clamp arms when said arms are in bag gripping position, and means effective to shift said clamp arms from bag gripping position upon movement of said frame to position the bag valve on the filling spout.

18. In apparatus of the class described, a magazine supporting a plurality of valve bags having end flaps, means withdrawing individual bags from said magazine, a rest station, means advancing said withdrawn bags individually towards said rest station, means positioning said bags in said rest station, means pivoting the bag end flap to a position crosswise of the plane of the body, means swinging in longitudinal marginal regions of the flap in a direction towards the bag body, and means moving portions of the flap adjacent the body in a direction away from the bag bottoms thus to open the valve.

19. In apparatus of the class described for applying a valve bag to a filling spout, a magazine supporting a plurality of valve bags, means withdrawing individual bags from said magazine, a rest station, a horizontal cross-feed table for advancing said withdrawn bags towards said rest station, deflective means for positioning said bags in said rest station, bag conditioning means opening the bag valve, an applicator assembly including opposed arms movable to grip the bag body in said rest station, means shifting said assembly and bag towards the filling spout, and means carried by said assembly for maintaining the valve open when said arms grip the bag body, wherefore said valve receives the spout as it moves towards same.

20. In apparatus of the class described for applying valve bags to filling spouts, a magazine supporting a plurality of valve bags having end flaps, means withdrawing individual bags from said magazine and advancing them towards a rest station, bag feed means supported for eccentric movement intermittently to engage and advance the bag towards said bag withdrawing means, means positioning the bags individually in the rest station, means opening the bag valves while in the rest station and means shifting the bags from the rest station to apply the valves to a filling spout.

21. In apparatus of the class described, a magazine supporting a plurality of bags stacked on edge in side by side relation, said magazine including fixed bag support means and the base of said magazine further including eccentrically actuated longitudinally extending members, driven endless members disposed adjacent the top of said magazine for engaging the corresponding edges of said bags, said longitudinally extending members and said endless members cooperating to intermittently advance the bags horizontally towards an end of the magazine, bag withdrawing means picking the leading bag from the stack at the advance end of the magazine including pivotally mounted vacuum cup means engageable with the leading bag, and roll means having a nip for receiving said leading bag to deliver the bag to receiving means.

22. In apparatus of the class described, a magazine supporting a plurality of bags stacked on edge in side by side relation, said magazine including fixed bag support means and bag feed means mounted for eccentric movement relatively to said fixed bag support means intermittently to advance the bags horizontally towards an end of the magazine, bag withdrawing means picking the leading bag from the stack at the advance end of the magazine, separator arms, means moving the separator arms between the lead bag and the next successive bag in the stack prior to each cycle of operation of the bag withdrawing means, and bag feed control means responsive to the movement of the advancing stack of bags to interrupt operation of the bag feed means and operable upon withdrawal of a bag from the stack to permit operation of the bag feed means.

23. In apparatus of the class described for conditioning valve bags having end flaps, means supporting a bag in rest position, yieldable head means actuated by the arm of a bell crank for pivoting the bag end flap to a position crosswise of the plane of the body, lever means having ball ends for moving portions of the flap adjacent the body in a direction away from the bag bottom thus to open the valve, means stabilizing said flap with respect to the plane of said body and clamp means engaging the bag intermediate its valve end and bottom and shifting the bag relatively to a filling spout while the valve is supported in its open position to situate an end of the spout within the bag.

24. A method of conditioning a valve bag for reception of a fill tube comprising: positioning the bag in a rest station, registering the bag endwise in vertical disposition with the valve facing downwardly in said station for action thereon by conditioning elements, securely supporting the bag in registered position in said station, and actuating said conditioning elements to open the valve in the bag, stabilizing said flap with respect to the bag body, gripping said bag in said station and while maintaining the valve in open position swinging said bag through an arc of the order of about 90 degress with respect to said fill tube so that said tube is received within the valve.

25. In apparatus of the class described, a magazine supporting a plurality of bags, bag withdrawing means picking an individual bag from said magazine, bag conveyor means, a table receiving such individual bag from said withdrawing means, means shifting said table, and means urging the bag from said table to said bag conveyor means.

26. In apparatus of the class described, a magazine supporting a plurality of bags, a conveyor, bag withdrawing means picking bags individually from said magazine, a table receiving said bags from said withdrawing means, actuating means shifting said table to a position adjacent said conveyor, and means including feed rolls transferring said bags from said table to said conveyor.

27. In apparatus of the class described, a rest station, means delivering a closed valve bag to said rest station, a bag applicator arm adapted to grip the bag in said rest station and to shift same towards a filling station, said applicator arm including suction cups operable to engage the bag and open the valve therein and to maintain same open to receive a fill tube at said fill station.

References Cited by the Examiner
UNITED STATES PATENTS

| | | | |
|---|---|---|---|
| 2,019,211 | 10/35 | Clare | 53—188 |
| 2,288,603 | 7/42 | Berch | 53—384 |
| 2,684,191 | 7/54 | Dolman | 53—188 |
| 2,828,596 | 4/58 | Dowty et al. | 53—190 |
| 3,053,027 | 9/62 | Frost | 53—190 |

TRAVIS S. McGEE, *Primary Examiner.*

ROBERT A. LEIGHEY, FRANK A. BAILEY,
*Examiners.*

UNITED STATES PATENT OFFICE
CERTIFICATE OF CORRECTION

Patent No. 3,213,588                                          October 26, 1965

William Roy Peterson

It is hereby certified that error appears in the above numbered patent requiring correction and that the said Letters Patent should read as corrected below.

Column 4, line 12, for "one", first occurrence, read -- on --; column 5, line 43, for "comprises" read -- comprise --; column 13, line 2, after "delivery" insert -- cycle --; line 3, strike out "cycle"; column 16, line 36, for "in", first occurrence, read -- the --.

Signed and sealed this 4th day of October 1966.

(SEAL)
Attest:

ERNEST W. SWIDER
Attesting Officer

EDWARD J. BRENNER
Commissioner of Patents